US012764681B2

(12) United States Patent
Lee et al.

(10) Patent No.: US 12,764,681 B2
(45) Date of Patent: Oct. 13, 2026

(54) TECHNIQUES FOR ASSOCIATING MULTI-MODAL DATA IN WIRELESS COMMUNICATIONS

(71) Applicant: QUALCOMM Incorporated, San Diego, CA (US)

(72) Inventors: Hyun Yong Lee, San Diego, CA (US); Peerapol Tinnakornsrisuphap, San Diego, CA (US); Prashanth Haridas Hande, San Diego, CA (US); Nikolai Konrad Leung, San Francisco, CA (US); Sebastian Speicher, Wallisellen (CH); Imed Bouazizi, Frisco, TX (US); Mickael Mondet, Louannec (FR); Diana Maamari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 202 days.

(21) Appl. No.: 18/521,867

(22) Filed: Nov. 28, 2023

(65) Prior Publication Data

US 2025/0175912 A1 May 29, 2025

(51) Int. Cl.
*H04W 56/00* (2009.01)
*H04L 65/65* (2022.01)
*H04W 88/06* (2009.01)

(52) U.S. Cl.
CPC ........... *H04W 56/001* (2013.01); *H04L 65/65* (2022.05); *H04W 88/06* (2013.01)

(58) Field of Classification Search
CPC .... H04W 56/001; H04W 88/06; H04L 65/65; H04L 65/80
See application file for complete search history.

(56) References Cited

U.S. PATENT DOCUMENTS

| | | | | |
|---|---|---|---|---|
| 9,433,011 | B2 | 8/2016 | Hwang et al. | |
| 2025/0220603 | A1 * | 7/2025 | Starsinic | H04W 76/20 |

FOREIGN PATENT DOCUMENTS

| | | | |
|---|---|---|---|
| WO | 2015061110 | A2 | 4/2015 |
| WO | 2023192094 | A1 | 10/2023 |

OTHER PUBLICATIONS

International Search Report and Written Opinion—PCT/US2024/053936—ISA/EPO—Dec. 20, 2024.

* cited by examiner

*Primary Examiner* — Chandrahas B Patel
(74) *Attorney, Agent, or Firm* — ArentFox Schiff, LLP

(57) ABSTRACT

Aspects described herein relate to receiving, from an application, first data for a first service data flow corresponding to a first device of multiple devices associated with a multi-modal service, receiving, from the application, second data for a second service data flow corresponding to a second device of the multiple devices associated with the multi-modal service, and applying, based on values of one or more parameters in a header of the first data and a header of the second data, an association between the first data and the second data.

29 Claims, 8 Drawing Sheets

TECHNIQUES FOR ASSOCIATING MULTI-MODAL DATA IN WIRELESS COMMUNICATIONS

FIELD OF THE DISCLOSURE

Aspects of the present disclosure relate generally to wireless communication systems, and more particularly, to communicating multi-modal data.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, from an application, first data for a first service data flow corresponding to a first device of multiple devices associated with a multi-modal service, receive, from the application, second data for a second service data flow corresponding to a second device of the multiple devices associated with the multi-modal service, and apply, based on values of one or more parameters in a header of the first data and a header of the second data, an association between the first data and the second data.

In another aspect, a method for wireless communications is provided that includes receiving, from an application, first data for a first service data flow corresponding to a first device of multiple devices associated with a multi-modal service, receiving, from the application, second data for a second service data flow corresponding to a second device of the multiple devices associated with the multi-modal service, and applying, based on values of one or more parameters in a header of the first data and a header of the second data, an association between the first data and the second data.

In another aspect, an apparatus for wireless communications is provided that includes means for receiving, from an application, first data for a first service data flow corresponding to a first device of multiple devices associated with a multi-modal service, means for receiving, from the application, second data for a second service data flow corresponding to a second device of the multiple devices associated with the multi-modal service, and means for applying, based on values of one or more parameters in a header of the first data and a header of the second data, an association between the first data and the second data.

In yet another aspect, a computer-readable storage medium, including computer-executable code for wireless communications, is provided. The code includes code for receiving, from an application, first data for a first service data flow corresponding to a first device of multiple devices associated with a multi-modal service, receiving, from the application, second data for a second service data flow corresponding to a second device of the multiple devices associated with the multi-modal service, and applying, based on values of one or more parameters in a header of the first data and a header of the second data, an association between the first data and the second data.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
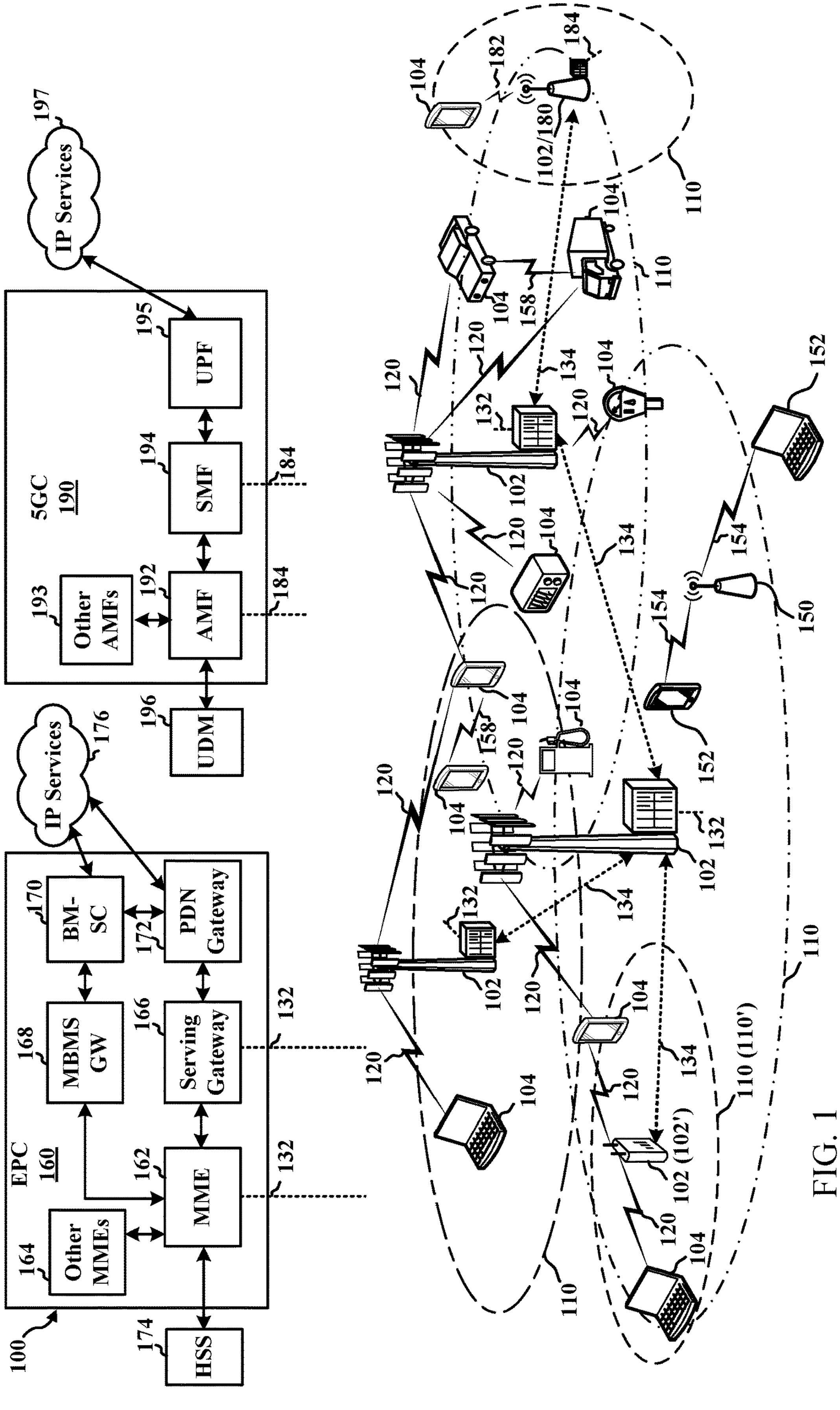
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating multi-modal data in wireless communications. Multi-modal data can include data that is communicated with multiple end user devices, or multiple functions of a single end user device, over corresponding service data flows, where the multiple end user devices or functions may be concurrently used by a user. As such, there may be a temporal relationship between the data being communicated over the multiple corresponding service data flows, but such a relationship may not be defined by or for the data. As a result, it is possible that data communicated over different service data flows may have different associated obstacles or challenges in a communication path or at an application server or end user device, and the data may not arrive or be processed in such a way that conveys the temporal relationship. Accordingly, aspects described herein relate to addressing such obstacles or challenges in the communication path by indicating an association between data related to the different service data flows to allow for providing the data to the associated end user devices or functions at a similar time to convey the temporal relationship between the data.

In third generation partnership project (3GPP) wireless communication networks, for example, multi-modal communication services have been partially adopted in Release 18 (R18) as it applies to extended reality (XR) applications. For example, in 3GPP, a multi-modal service identifier (ID) is defined to identify which flows are associated for multi-modality (e.g., flows between an application function (AF) and a policy and charging function (PCF) in a fifth generation (5G) network, which may include policy and charging control (PCC) rule adaptation, such as packet delay budget (PDB) or priority level). In accordance with aspects described herein, the multi-modal flows can be substantially synchronized to each other, such that data in the flows is delivered close in time to one another by the radio access network (RAN). For example, in R18 XR, a synchronization threshold is defined as a quality-of-service (QOS) parameter for service data flows. Aspects described herein can relate to causing the RAN to deliver two (or more) multi-modal flows within the synchronization threshold. This may be challenging, for example, where the multi-modal flows have a large jitter of burst arrival time, different periodicities and processing times, etc.

In one example, an XR application can consumes data in packet data unit (PDU) sets, rather than individual internet protocol (IP) packets, e.g., one video frame per burst, slices of a video frame per burst, etc. A PDU set can include a set of multiple IP packets representing a unit of information at the application, such as a video frame or frame burst. In an example, a slice of a video frame can include a portion of a video frame that is forward error correction (FEC) protected. A burst can include a set of IP packets/application data units (ADUs) that should be delivered to UE with the same or similar deadline, e.g., all slices of a video frame. For example, the application defining the multi-modal data to be transmitted to end user devices can specify transport layer requirements on PDU set (e.g., on slices of video frames). For 5G XR, real-time transport protocol (RTP) can be enhanced to indicate PDU set metadata, as described herein.

In 5G Rel 18, synchronization requirements are defined between different modalities, such as audio, visual, and tactile (or haptic) flows in technical release (TR) 22.847, but does not indicate to which PDU sets (or bursts) the synchronization requirements apply. There can be a time difference between PDU set deliveries to corresponding end users (e.g., user equipment (UEs)) or functions of a UE, which can be defined as a synchronization delay. There may be some challenges to complying with the synchronization delay between modalities. For example, multi-modal flows (e.g., multiple ones of audio, visual, and/or tactile or haptic flows) can have different periodicities that may not align with one another (e.g., 60 frames-per-second (fps) for video, 100 hertz (Hz) for haptic, etc.). As such, for example, burst arrival time of multi-modal flows may not properly align to each other, and can be placed anywhere. In addition, burst arrival time of each multi-modal flow can have a wide range of jitter (e.g., a 3GPP XR video traffic model may have XR cadence=60 fps (16.666 milliseconds (ms)) versus jitter=8 ms, such that 48% of periodicity can be affected by jitter). This can further complicate the PDU set association problem. Additionally, for example, multi-modal flows can have different encoding and/or decoding times, such that even if the PDU sets arrive or are generated or delivered to the end user devices or functions within a threshold time, the data may not necessarily be played back closely in time.

As such, in some examples, aspects described herein relate to enabling the RAN to delivery an associated PDU set before the synchronization threshold, such that the synchronization delay is less than or equal to the synchronization threshold. Aspects described herein can provide a mechanism to define which PDU set of one flow is to be synchronized or otherwise associated with which PDU set of another flow, e.g., to provide PDU set association of multi-modal flows. For example, aspects described herein provide consideration for: (1) where PDU Set association can occur (e.g., which node, such as application server, user plane function (UPF), RAN, etc.), (2) the mechanism for PDU set association (e.g., associating a last delivered PDU set, a last arriving PDU set, time sensitive communication assistance information (TSCAI), etc.), which may occur via explicit marking of associated PDU set, RTP timestamp, and/or the like, and/or (3) signaling of association to RAN if and/or identifying a node at which PDU set association is performed (e.g., via (GPRS) tunneling protocol (GTP)-user plane (U) protocol, PDU set metadata (RTP/secure RTP (SRTP), etc.).

Providing association of PDU sets (or bursts), for the purpose of meeting a synchronization threshold or otherwise, in this regard can allow for expressing a temporal relationship between service data flow data. This can improve user experience in environments that have end user device(s) or corresponding functions of a single end user device that render the data for a user (e.g., XR applications). Such devices or functions can include multiple ones of an audio device, video device, tactile or haptic feedback device, etc. For example, in an XR application, such as a game or other application, mitigating synchronization errors between video data being shown on a display and haptic feedback having a temporal relationship can improve the user experience when using a device or devices that render the video and haptic feedback.

The described features will be presented in more detail below with reference to FIGS. 1-8.

As used in this application, the terms “component,” “module,” “system” and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X. Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms “system” and “network” may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wide-band CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ. WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), cFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (cNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
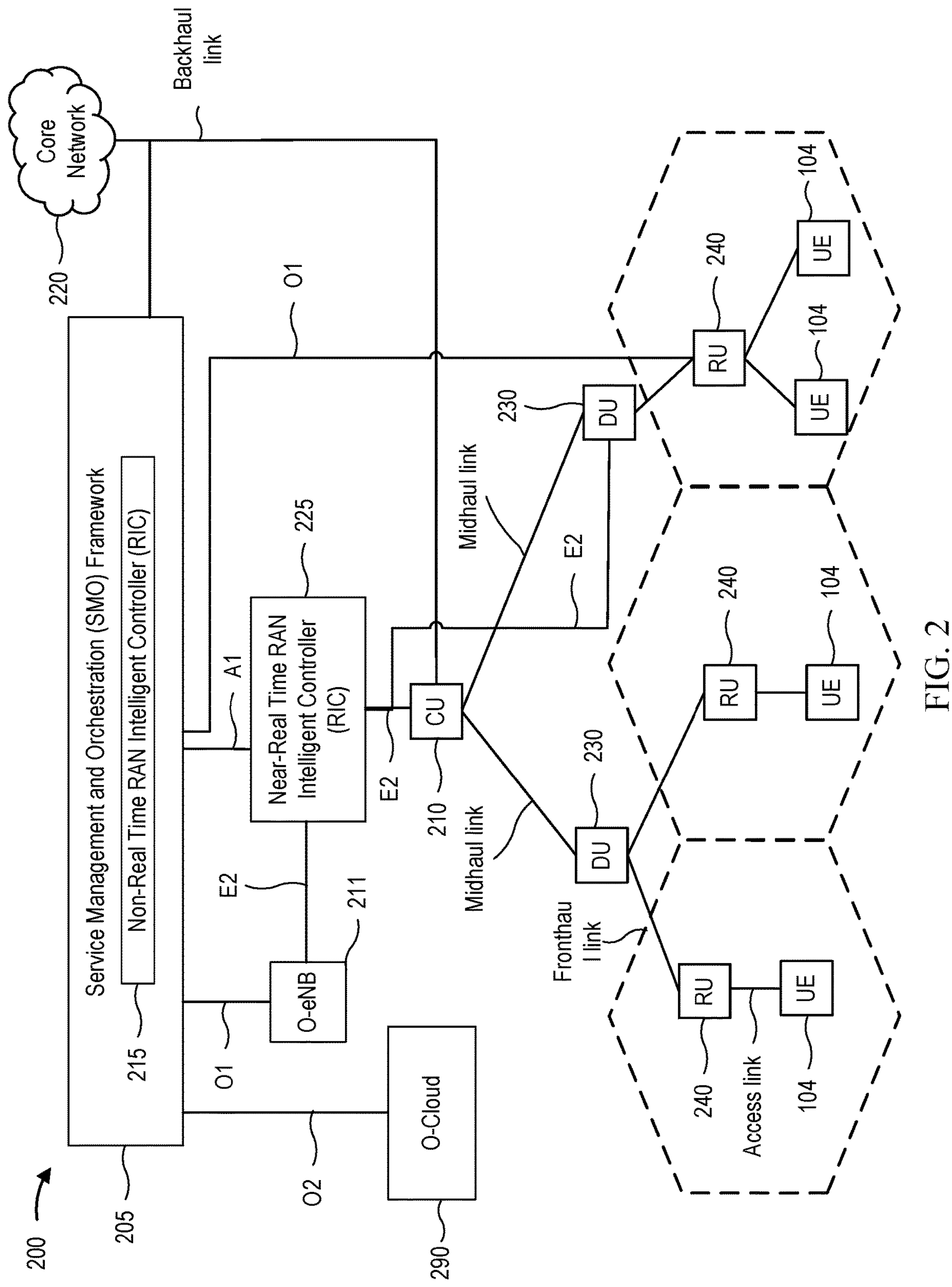
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 4:
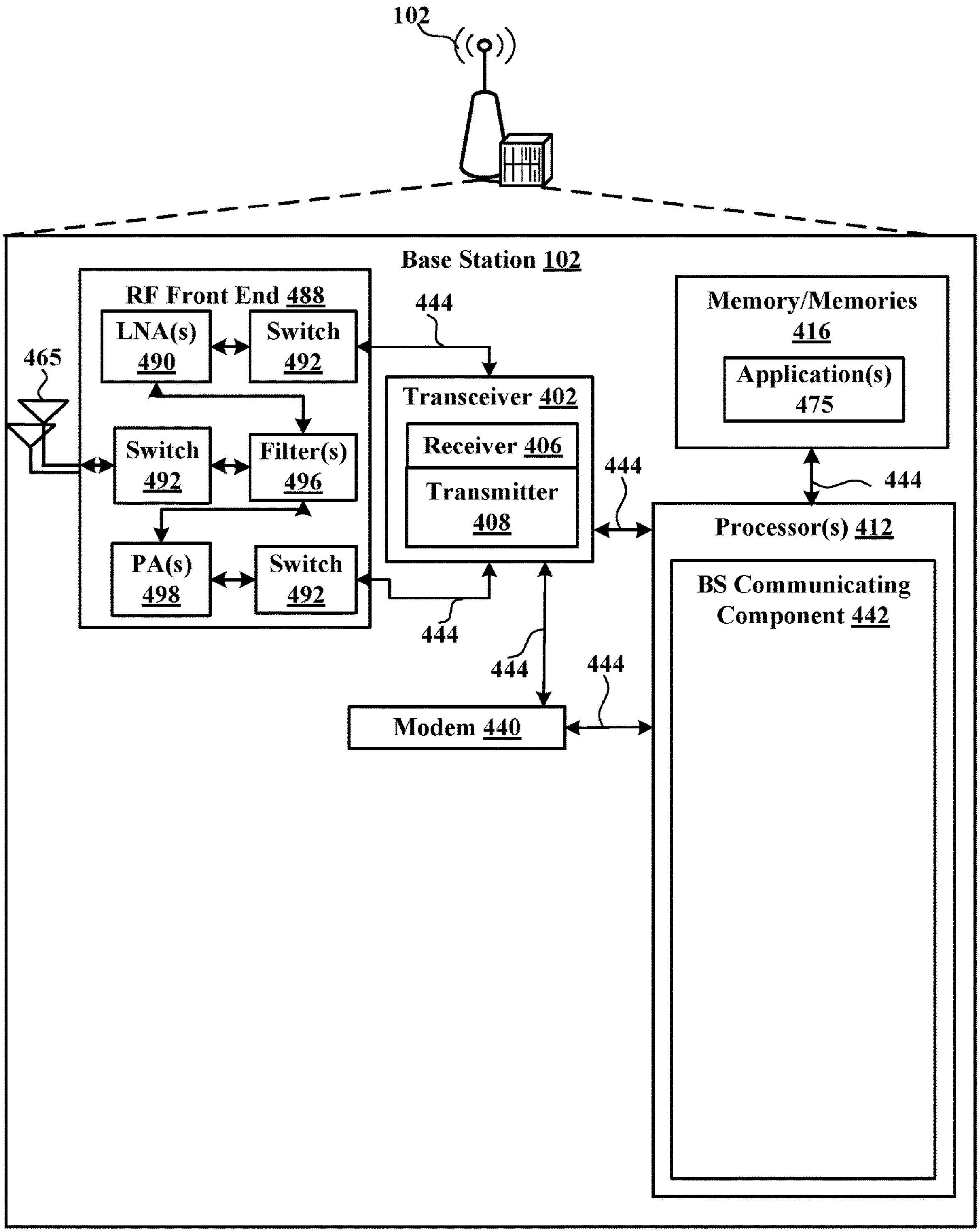
FIG. 4 is a block diagram illustrating an example of a base station, in accordance with various aspects of the present disclosure.
Figure 5:
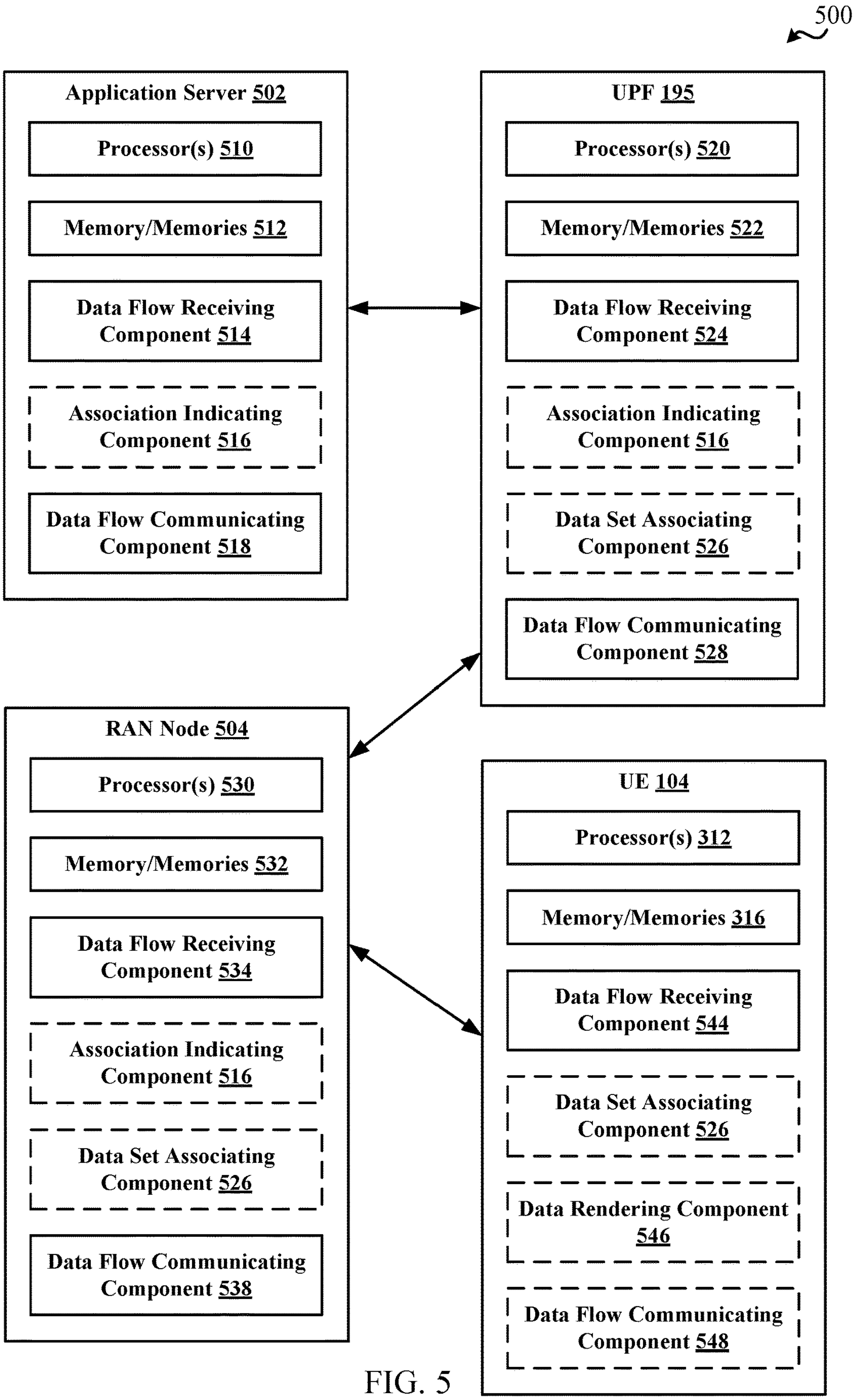
FIG. 5 illustrates an example of nodes of a wireless communication network that can be communicatively coupled for providing multi-modal data communications for one or more end user devices, in accordance with aspects described herein.
Figure 6:
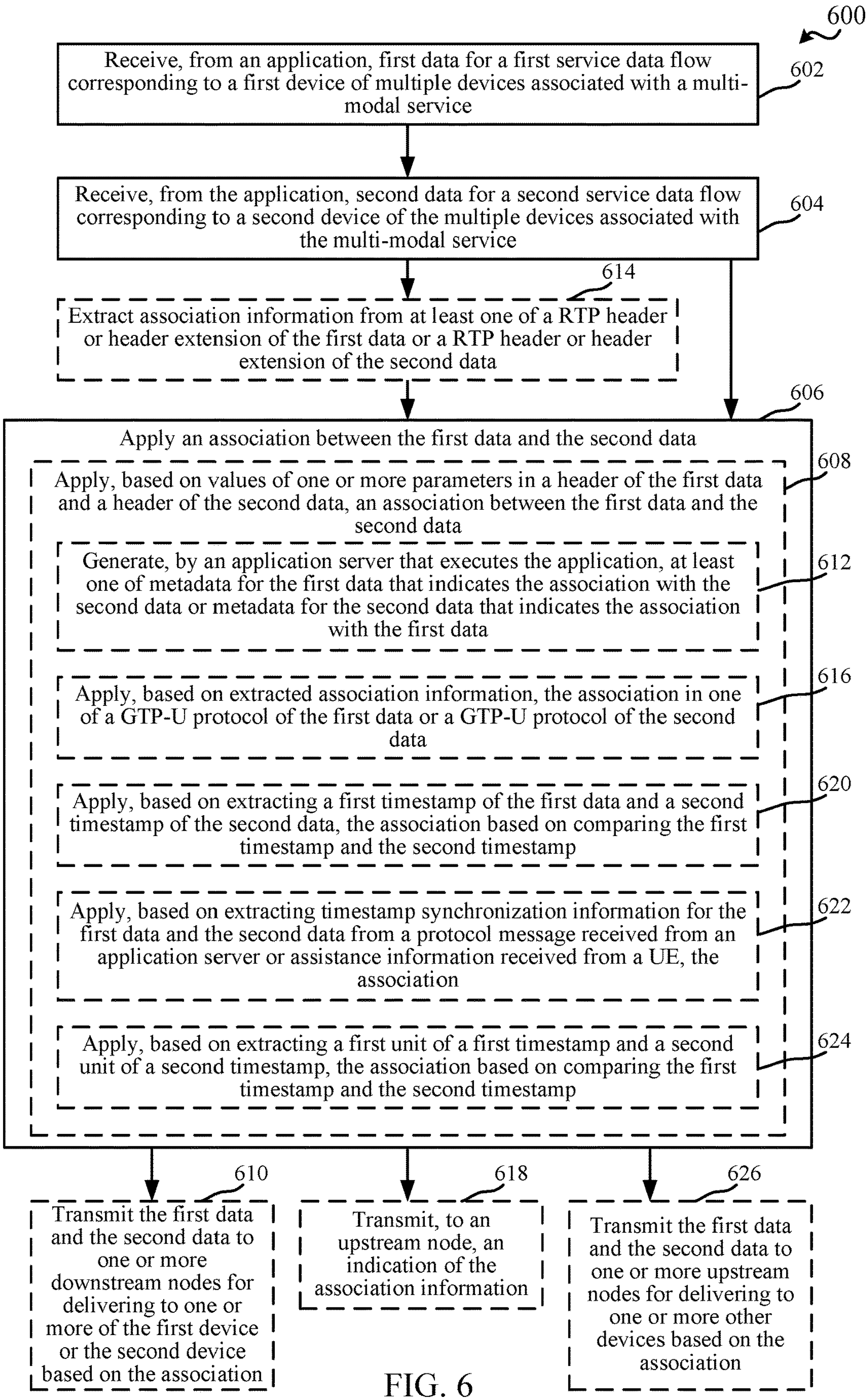
FIG. 6 is a flow chart illustrating an example of a method for applying data set associations for multi-modal data to facilitate rendering the multi-modal data at a same or similar time, in accordance with aspects described herein.

Turning now to FIGS. 3-8, aspects are depicted with reference to one or more components and one or more methods that may perform the actions or operations described herein, where aspects in dashed line may be optional. Although the operations described below in FIG. 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
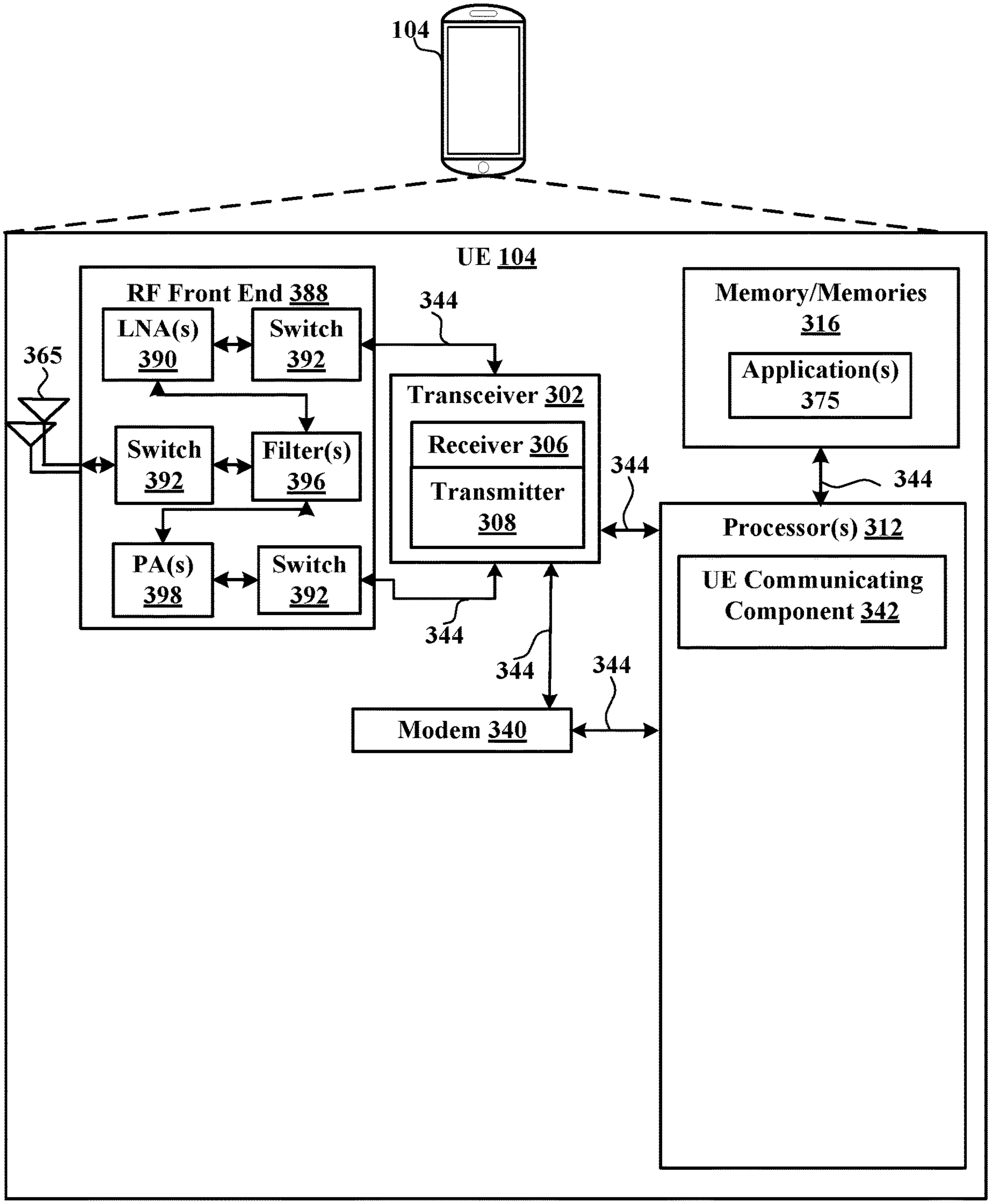
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for rendering multi-modal data, such as audio data, video data, and/or haptic data, received in a wireless communication network over one or more service data flows, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAS) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 8:
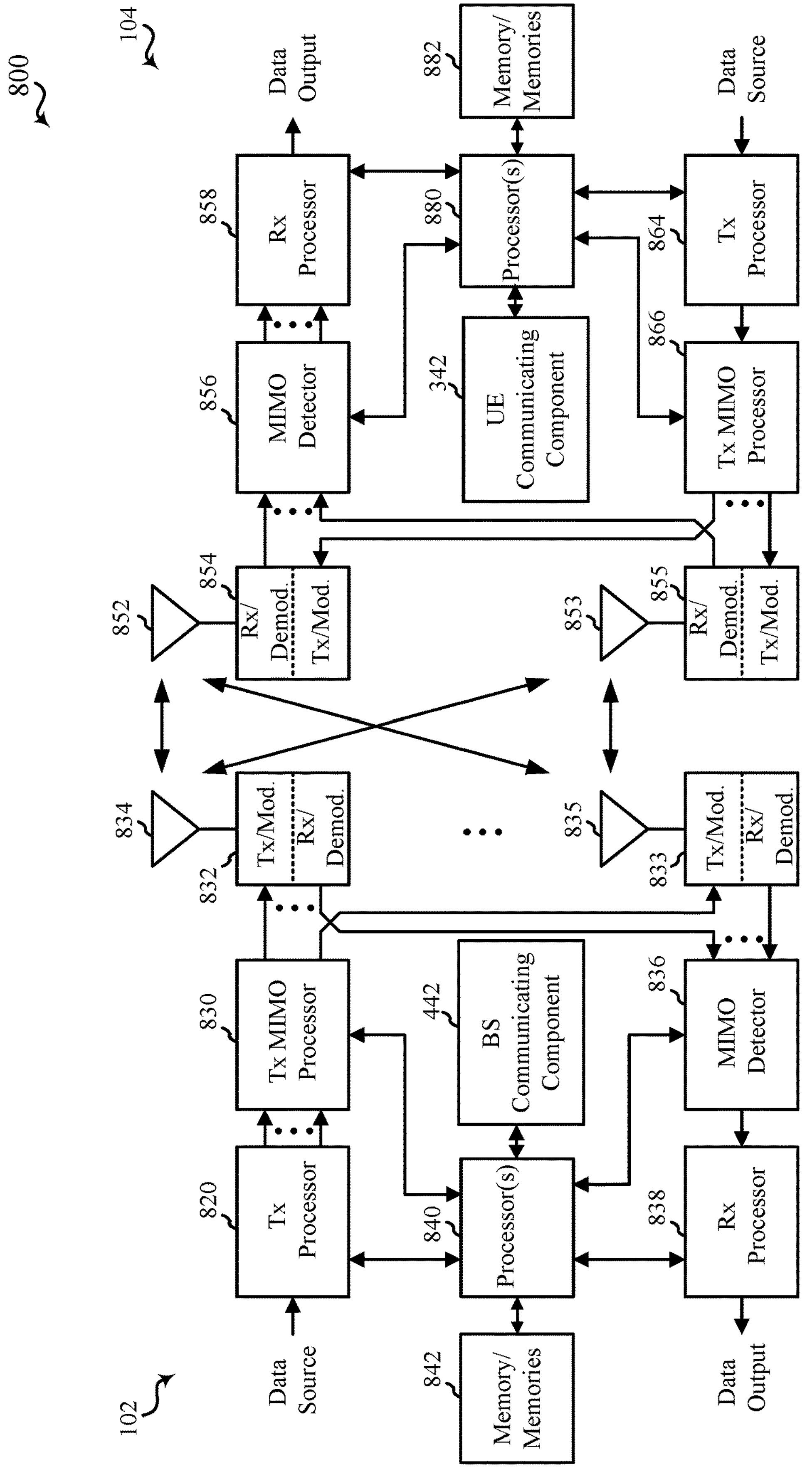
FIG. 8 is a block diagram illustrating an example of a multiple-input multiple-output (MIMO) communication system including a base station and a UE, in accordance with various aspects of the present disclosure.

In an aspect, the processor(s) 312 may correspond to one or more of the processors described in connection with the UE in FIG. 8. Similarly, the memory/memories 316 may correspond to the one or more memories described in connection with the UE in FIG. 8.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for transmitting or forwarding multi-modal data, such as audio data, video data, and/or haptic data, received in a wireless communication network (e.g., from an application server, UPF, etc.), to one or more UEs over one or more corresponding service data flows, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, the processor(s) 412 may correspond to one or more of the processors described in connection with the base station in FIG. 8. Similarly, the memory/memories 416 may correspond to the one or more memories described in connection with the base station in FIG. 8.

FIG. 5 illustrates an example of nodes 500 of a wireless communication network that can be communicatively coupled for providing multi-modal data communications for one or more end user devices, in accordance with aspects described herein. For example, nodes 500 can include an application server 502, UPF 195, RAN node 504, and/or UE 104. For example, application server 502 can execute with or as one or more IP services 197 as described in FIG. 1, or can communicate with the UPF 195 and/or one or more other nodes of the wireless communication network via IP services 197 or other nodes/services to provide data to UE(s) through the wireless communication network. For example, application server 502 can execute an application that provides multi-modal data to multiple UEs and/or a single UE having multiple functions that consume the multi-modal data, such as an XR application having video data and haptic data, which can be sent over different service data flows. In an example, RAN node 504 can include substantially any node in the wireless communication network that is downstream of the UPF 195, such as SMF 194, AMF 192, radio network controller, base station 102/gNB 180, etc.

In an example, application server 502 can include one or more processors 510 and memory/memories 512, which can be similar to processor(s) and/or memory/memories described herein, for storing and/or executing instructions to provide functionality of one or more components described herein. For example, application server 502 can include a data flow receiving component 514 for receiving data for multi-modal communication from an application executing via application server 502, which can include data for an application (e.g., an XR application) having multiple modalities, and the data can have a temporal relationship, such as haptic data to be rendered along with certain video data. The application can generate, and/or the application server 502 can receive, the data separately for each modality for transmitting over a corresponding service data flow. Application server 502 may optionally include an association indicating component 516 for indicating an association between data or data sets for each of multiple modalities to assist in determining data or data sets to be rendered at the same or similar time. As described in various examples herein, the association indicating component 516 can be implemented additionally or alternatively by other nodes in the wireless communication network. Application server 502 can also include a data flow communicating component 518 for transmitting the data or data sets (e.g., or bursts) for each modality to one or more UEs over a given service data flow.

In an example, UPF 195 can include one or more processors 520 and memory/memories 522, which can be similar to processor(s) and/or memory/memories described herein, for storing and/or executing instructions to provide functionality of one or more components described herein. For example, UPF 195 can include a data flow receiving component 524 for receiving multi-modal data or data sets over corresponding service data flows (e.g., from application server 502). UPF 195 may optionally include a data set associating component 526 for associating two or more data sets for different modalities based on information related to the datasets. For example, the information can be generated by association indicating component 516 of the application server 502 and/or can include metadata, data in an RTP header, etc., in accordance with various examples described herein. UPF 195 may also optionally include the association indicating component 516 for indicating an association between data or data sets for each of multiple modalities to assist in determining data or data sets to be rendered at the same or similar time. UPF 195 can also include a data flow communicating component 528 for transmitting (or forwarding) the data or data sets (e.g., or bursts) for each modality to one or more UEs over the given service data flows.

In an example, RAN node 504 can include one or more processors 530 and memory/memories 532, which can be similar to processor(s) and/or memory/memories described herein, for storing and/or executing instructions to provide functionality of one or more components described herein. For example, RAN node 504 can include a data flow receiving component 534 for receiving multi-modal data or data sets over corresponding service data flows (e.g., from UPF 195). RAN node 504 may optionally include a data set associating component 526 for associating two or more data sets for different modalities based on information related to the datasets. For example, the information can be generated by association indicating component 516 of the application server 502 or UPF 195 and/or can include metadata, data in an RTP header, etc., in accordance with various examples described herein. RAN node 504 may also optionally include the association indicating component 516 for indicating an association between data or data sets for each of multiple modalities to assist in determining data or data sets to be rendered at the same or similar time. RAN node 504 can also include a data flow communicating component 538 for transmitting (or forwarding) the data or data sets (e.g., or bursts) for each modality to one or more UEs over the given service data flows.

In an example, UE 104 can include one or more processors 312 and memory/memories 316, which can be similar to processor(s) and/or memory/memories described herein, for storing and/or executing instructions to provide functionality of one or more components described herein. For example, UE can include a data flow receiving component 544 for receiving multi-modal data or data sets over corresponding service data flows. UPF 195 may optionally include a data set associating component 526 for associating two or more data sets for different modalities based on information related to the datasets. For example, the information can be generated by association indicating component 516 of the application server 502, UPF 195, and/or RAN node 504, and/or can include metadata, data in an RTP header, etc., in accordance with various examples described herein. UE 104 may also optionally include a data rendering component 546 for rendering the data or data sets received over one or more service data flows, in accordance with aspects described herein. For example, data rendering component 546 can render data or data sets from a service data flow at a similar time as data is rendered (e.g., by UE 104 or another UE) from another service data flow based on an indicated association between the data or data sets. UE 104 can also include a data flow communicating component 548 for transmitting (or forwarding) the data or data sets (e.g., or bursts) for each modality to one or more other UEs over the given service data flows in uplink or upstream communications.

FIG. 6 illustrates a flow chart of an example of a method 600 for applying data set associations for multi-modal data to facilitate rendering the multi-modal data at a same or similar time, in accordance with aspects described herein. In an example, one or more of an application server 502, UPF 195, RAN node 504 and/or UE 104 can perform the functions described in method 600 shown in FIG. 6 using one or more of the components described in FIGS. 1, 3, 4, and/or 5.

In method 600, at Block 602, first data for a first service data flow corresponding to a first device of multiple devices associated with a multi-modal server can be received from an application. In an aspect, data flow receiving component 514, 524, 534, and/or 544 can receive, from the application (e.g., via one or more upstream nodes), the first data for the first service data flow corresponding to the first device of multiple devices associated with the multi-modal service. For example, data flow receiving component 514, e.g., in conjunction with processor(s) 510, memory/memories 512, etc., can receive the first data from the application. In another example, data flow receiving component 524, e.g., in conjunction with processor(s) 520, memory/memories 522, etc., can receive the first data from the application server 502. In another example, data flow receiving component 534, e.g., in conjunction with processor(s) 530, memory/memories 532, etc., can receive the first data from the UPF. In another example, data flow receiving component 534, e.g., in conjunction with processor(s) 312, memory/memories 316, transceiver 302, etc., can receive the first data from the RAN node 504. For example, the first data can be associated with a first end user device, such as a first UE of multiple UEs, a single UE operating multiple end user devices (such as a display and a haptic device), etc. In addition, for example, data flow receiving component 514, 524, 534, and/or 544 can receive the first data according to a cadence associated with the data (e.g., a number of frames per second for video, a number of hertz associated with haptic data, etc.).

In method 600, at Block 604, second data for a second service data flow corresponding to a second device of multiple devices associated with a multi-modal server can be received from an application. In an aspect, data flow receiving component 514, 524, 534, and/or 544 can receive, from the application (e.g., via one or more upstream nodes), the second data for the second service data flow corresponding to the second device of multiple devices associated with the multi-modal service. For example, data flow receiving component 514, e.g., in conjunction with processor(s) 510, memory/memories 512, etc., can receive the second data from the application. In another example, data flow receiving component 524, e.g., in conjunction with processor(s) 520, memory/memories 522, etc., can receive the second data from the application server 502. In another example, data flow receiving component 534, e.g., in conjunction with processor(s) 530, memory/memories 532, etc., can receive the second data from the UPF. In another example, data flow receiving component 534, e.g., in conjunction with processor(s) 312, memory/memories 316, transceiver 302, etc., can receive the second data from the RAN node 504. For example, the second data can be associated with a second end user device, such as a first UE of multiple UEs, a single UE operating multiple end user devices (such as a display and a haptic device), etc. In addition, for example, data flow receiving component 514, 524, 534, and/or 544 can receive the second data according to a cadence associated with the data (e.g., a number of frames per second for video, a number of hertz associated with haptic data, etc.).

In method 600, at Block 606, an association can be applied between the first data and the second data. In an aspect, association indicating component 516 and/or data set associating component 526 can apply the association between the first data and the second data. For example, association indicating component 516, e.g., in conjunction with processor(s) 510, 520, or 530, memory/memories 512, 522, or 532, etc., can apply the association at least in part by generating metadata or additional data in an RTP header of each of the first data and the second data to allow a downstream node (e.g., UPF 195, RAN node 504, UE 104, etc.) to associate the first and second data in forwarding the data to the associated UE or end user device or rendering the data at the UE or end user device. In another example, data set associating component 526, e.g., in conjunction with processor(s) 520, 530, or 312, memory/memories 522, 532, or 316, etc., can apply the association at least in part by obtaining the association information from an upstream node (e.g., as applied by an association indicating component 516 of an upstream node) and using the association information to associate the data for rendering or forwarding to the UE(s) or end user device(s) for rendering.

In applying the association at Block 606, optionally at Block 608, an association can be applied between the first data and the second data based on values of one or more parameters in a header of the first data and a header of the second data. In an aspect, association indicating component 516 and/or data set associating component 526 can apply, based on values of one or more parameters in the header of the first data and the header of the second data, the association between the first data and the second data. For example, association indicating component 516, e.g., in conjunction with processor(s) 510, 520, or 530, memory/memories 512, 522, or 532, etc., can apply the association at least in part by generating metadata or additional data in an RTP header of each of the first data and the second data to allow a downstream node (e.g., UPF 195, RAN node 504, UE 104, etc.) to associate the first and second data in forwarding the data to the associated UE or end user device or rendering the data at the UE or end user device. In another example, data set associating component 526, e.g., in conjunction with processor(s) 520, 530, or 312, memory/memories 522, 532, or 316, etc., can apply the association at least in part by obtaining the association information from an upstream node (e.g., as applied by an association indicating component 516 of an upstream node) and using the association information to associate the data for rendering or forwarding to the UE(s) or end user device(s) for rendering.

In method 600, optionally at Block 610, the first data and the second data can be transmitted to one or more downstream nodes for delivering to one or more of the first device or the second device based on the association. In an aspect, data flow communicating component 518, 528, or 538, e.g., in conjunction with processor(s) 510, 520, or 530, memory/memories 512, 522, or 532, etc., can transmit the first data and the second data to one or more downstream nodes for delivering to one or more of the first device or the second device based on the association (e.g., deliver the first and second data that are associated at a same or similar time), in accordance with various aspects described herein.

In one example, association between data sets (e.g., PDU sets) can be explicitly marked. For example, the application server 502 may know which data sets are associated (e.g., which PDU set of one multi-modal flow is associated to which PDU set of another multi-modal flow). For example, application server 502 may determine to associate data sets having respective timing information that is within a synchronization threshold. In an example, the application server 502 may accordingly explicitly mark the association of the first data (or data set) of the first service data flow with the second data (or data set) of the second service data flow, which may be marked in the first data and/or in the second data. An example is shown in FIG. 7.

Figure 7:
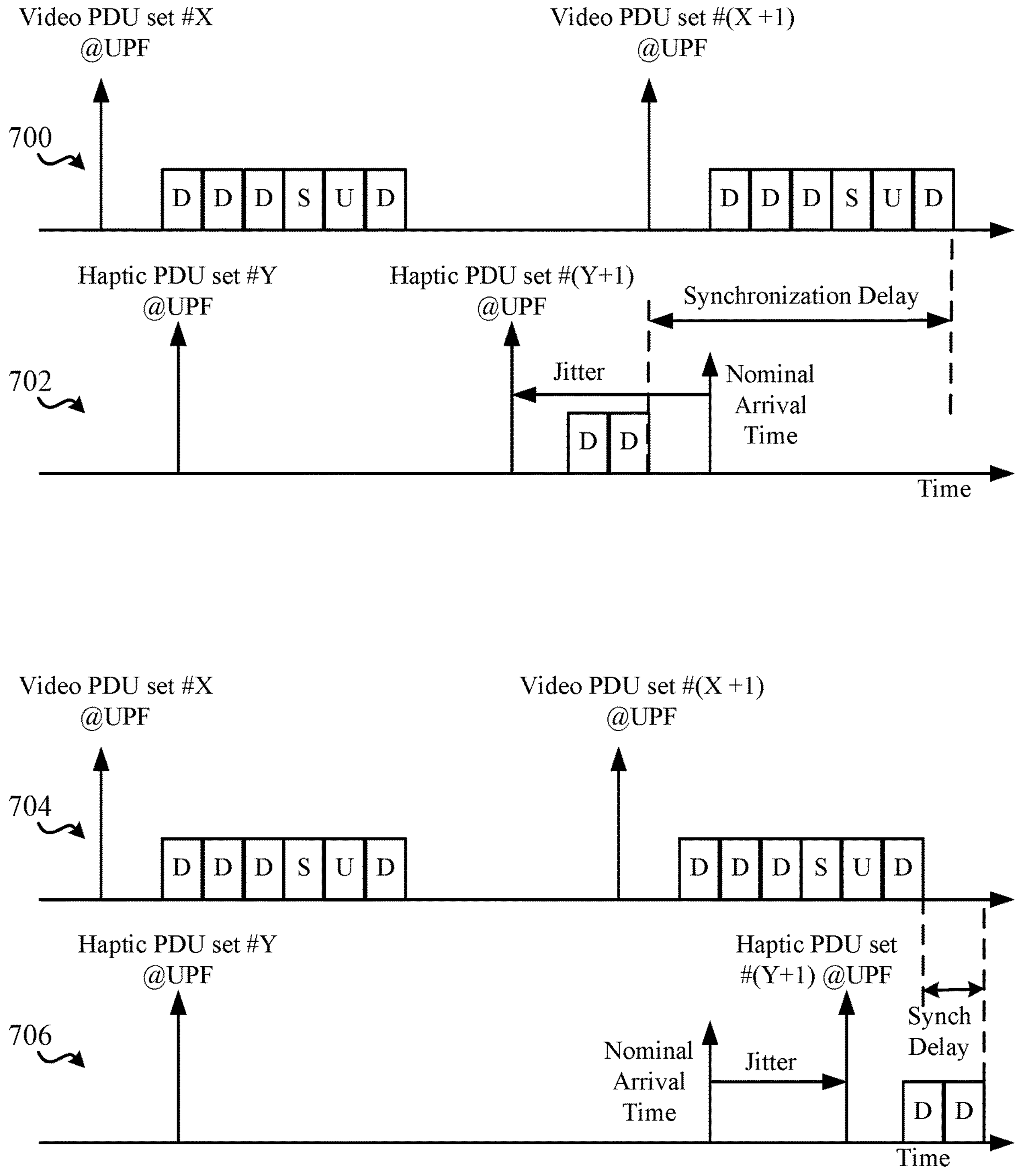
FIG. 7 illustrates examples of data sets communicated over timelines, in accordance with aspects described herein.

FIG. 7 illustrates examples of data sets communicated over timelines 700, 702, 704, and 706, in accordance with aspects described herein. In timelines 700 and 704, video data can be communicated in video frames at a cadence of 60 fps, and in timelines 702 and 706, haptic data can be communicated at 100 Hz. In an example, an application server 502 can receive, from the application, the video data (e.g., first data) at 60 fps and the haptic data (e.g., second data) at 100 Hz. In another example, UPF can receive, from the application server 502, the video data (e.g., first data) at 60 fps and the haptic data (e.g., second data) at 100 Hz. In FIG. 7, the data can include downlink data in downlink slots, shown as 'D', a slot for switching between downlink and uplink, shown as 'S', and an uplink slot for transmitting feedback or other communications from the UE, shown as 'U'. As shown in FIG. 7, there can be jitter in the haptic data based on the nominal arrival time of the data and the time that the haptic PDU set #(Y+1) is transmitted to the UPF 195. There can also be a synchronization delay between the video data and the haptic data based on the difference in cadence.

Associating the data as described herein, however, can mitigate the effects of jitter and/or synchronization delay by allowing an indication of association between data sets. For example, an association indicating component 516 of one or more nodes can, as described herein, indicate an association between video PDU set #(X+1) and haptic PDU set #(Y+1), and this information can be used by a downstream node for forwarding or rendering the data sets at a same or similar time. For example, association indicating component 516 can indicate, in metadata for the haptic PDU set #(Y+1) (e.g., the second data), an association with the video PDU set #(X+1) (e.g., the first data). In another example, association indicating component 516 can indicate, in metadata for the video PDU set #(X+1) (e.g., the first data), an association with the haptic PDU set #(Y+1) (e.g., the second data). In an example, association indicating component 516 of an application server 502 can indicate the association based on receiving the first data and second data via the application at similar times, within a threshold time of one another, based on an indication from the application, etc. In any case, the association indicated in the metadata can be used by one or more downstream nodes (e.g., UPF 195, RAN node 504, UE 104, etc.) to render the first and second data with a temporal association. The metadata can be included in a header or other portion of the first and/or second data. In an example, the RAN node 504 can compute the synchronization delay associated with the first data and the second data based on the association indicated in the metadata.

In an example, in applying the association at Block 608, optionally at Block 612, at least one of metadata for the first data that indicates the association with the second data or metadata for the second data that indicates the association with the first data can be generated by an application server that executes the application. In an aspect, association indicating component 516 of application server 502, e.g., in conjunction with processor(s) 510, memory/memories 512, etc., can generate at least one of metadata for the first data that indicates association with the second data or metadata for the second data that indicates the association with the first data. The metadata can include, for example, a RTP header extension or other data structure described herein.

In an example, referring to FIG. 5, application server 502 can communicate with UPF 195 over an N6 interface, as defined in 5G NR, and association indicating component 516 of application server 502 can indicate association between PDU sets across multiple multi-modal service data flows by using PDU set metadata associated with data in at least one of the multiple flows. In one example, association indicating component 516 of application server 502 can indicate the association in a RTP header extension associated with data of at least one of the multiple flows, where the association can be indicated as an association between multi-modal flows (e.g., a RTP header extension for one flow can identify one or more additional flows with which data is associated for rendering), an association of PDU set index of one or more association multi-modal flows (e.g., a RTP header extension for a PDU set of one flow can identify a PDU set of one or more additional flows that are associated for rendering), etc. In another example, PDU set dependency can be extended to indicate the PDU set index across multi-modal flows such that association indicating component 516 of application server 502 can indicate that a PDU set for one modality can depend on a PDU set for one or more other modalities, where the index can identify the PDU set for the one or more other modalities. For example, the PDU set index can include a value that is incremented for each PDU or PDU set generated by the application.

In another example, in method 600, optionally at Block 614, association information can be extracted from at least one of a RTP header or header extension of the first data or a RTP header or header extension of the second data. In an aspect, data set associating component 526 of UPF 195, e.g., in conjunction with processor(s) 520, memory/memories 522, etc., can extract association information from at least one of a RTP header or header extension of the first data or a RTP header or header extension of the second data. As described, for example, application server 502 can indicate the association information in the metadata (e.g., in RTP header or header extension) of one or more of the first data or the second data, and in this example, data flow communicating component 518 can send the first and second data over multiple flows to UPF 195 (e.g., as described in Block 610 for an application server 502 and/or using the N6 interface), data flow receiving component 524 can receive the first and second data (e.g., as described in Blocks 602 and 604 for a UPF 195), and data set associating component 526 of UPF 195 can extract the association information from the metadata for the first and/or second data.

In applying the association at Block 608, optionally at Block 616 for example, the association can be applied, based on the extracted association information, in one of a GTP-U header of the first data or a GTP-U header of the second data. In an aspect, data set associating component 526 of UPF 195, e.g., in conjunction with processor(s) 520, memory/memories 522, etc., can apply, based on the extracted association information, the association in one of a GTP-U protocol of the first data or a GTP-U protocol of the second data. In this example, data flow communicating component 528 can send the first data and second data with the associated GTP-U protocol to RAN node 504 (e.g., as described in Block 610 for a UPF 195 and/or using a N3 interface defined in 5G NR). In this example, data flow receiving component 534 of a RAN node 504 can receive the first and second data (e.g., as described in Blocks 602 and 604 for a RAN node 504) from the UPF 195 (e.g., over the N3 interface), and data set associating component 526 of RAN node 504 can extract the association information from the GTP-U header of the first data and/or the second data, and use the association information in determining to render the first data and second data in a same or similar time for UE 104 and/or other UEs or devices operated by the UE 104. In another example, UPF 195 can forward the PDU set along with metadata from application server 502 to RAN node 504, and data set associating component 526 of RAN node 504, e.g., in conjunction with processor(s) 530, memory/memories 532, etc., can extract association information from at least one of a RTP header or header extension of the first data or a RTP header or header extension of the second data, and use the association information in determining to render the first data and/or second data.

In yet another example, data set associating component 526 of UE 104, e.g., in conjunction with processor(s) 312, memory/memories 316, etc., can extract association information from at least one of a RTP header or header extension of the first data or a RTP header or header extension of the second data, and can provide the information upstream to the RAN node 504 in assistance information. In this example, data flow communicating component 538 can send the first and second data over multiple flows to UE 104, or multiple UEs or devices operated by UE 104 (e.g., as described in Block 610 for a RAN node 504), data flow receiving component 544 can receive the first and second data (e.g., as described in Blocks 602 and 604 for a UPF 195), and data set associating component 526 of UE 104 can extract the association information from the metadata for the first and/or second data. In method 600, optionally at Block 618, an indication of the association can be transmitted to an upstream node. In an aspect, data set associating component 526 of the UE 104, e.g., in conjunction with processor(s) 312, memory/memories 316, etc., can transmit, to an upstream node (e.g., RAN node 504), the indication of the association information between two or more PDU sets as extracted from metadata for at least one of the PDU sets.

In another example, timestamps associated with the data of the multi-modal communications can be used to determine association information (e.g., association between data in two or more different service data flows). For example, a timestamp of RTP header can indicate when the PDU set is to be played back at application layer. If the timestamps of PDU Sets of two multi-modal flows are closest, this can indicate that the PDU sets may be played back (e.g., rendered at the UE 104 or multiple UEs or multiple devices operated by the UE 104) closest in time.

In one example, in applying the association at Block 608, optionally at Block 620, the association can be applied, based on extracting a first timestamp of the first data and a second timestamp of the second data, based on comparing the first timestamp and the second timestamp. In an aspect, data set associating component 526 of the RAN node 504, e.g., in conjunction with processor(s) 530, memory/memories 532, etc., can apply, based on extracting the first timestamp of the first data and the second timestamp of the second data, the association based on comparing the first timestamp and the second timestamp. For example, the application or application server can generate the first data and/or second data with timestamp information (e.g., as part of the RTP header associated with each of the first data and the second data). For example, the timestamp information can be used by a receiver of the RTP data to play back received samples at appropriate time and interval. The timestamp can be a 32-bit values defined in the RTP packet header. The timestamp can be a realistic metric that can measure synchronization of multi-modal flows, and the RAN node 504 can know, based on the timestamp, when each PDU set is to be consumed by the UE 104 or other downstream node.

In an example, data set associating component 526 of the RAN node 504 can extract the timestamp of application layer header (e.g., RTP/SRTP) to identify the associated PDU set of the other multi-modal flow. For example, data set associating component 526 of the RAN node 504 can extract the timestamp of each PDU set for synchronization across multi-modal flows. The RAN node can use the time difference of two multi-modal flows in providing the first data and/or second data downstream (e.g., via data flow communicating component 538) and the RAN node 504 may accordingly not require synchronization with the application server 502.

In one example, data set associating component 526 of RAN node 504 may discover, for the first PDU set of the first multi-modal flow, the associated PDU set of the other multi-modal flow based on the closest timestamp (e.g., based on comparing the timestamp of the first PDU set with timestamps of one or more other PDU sets of the other multi-modal flow to determine which is closest in time). In another example, data set associating component 526 of RAN node 504 may discover, for the first PDU set of the first multi-modal flow, the associated PDU set of the other multi-modal flow based on the latest timestamp. In any case, data flow communicating component 538 can provide the associated data from the first multi-modal flow and the other multi-modal flow downstream (e.g., to UE 104) based on the association determined from the timestamps to indicate a temporal relationship between the data. For example, data flow communicating component 538 can provide the associated data at a similar or same time to result in rendering of the data at the UE 104 (or other UEs or multiple devices operated by the UE 104) at a same or similar time.

In some cases, a frame of data for one or more service data flows (e.g., a video frame) can be split over multiple RTP packets, and in this example, all RTP packets associated with the frame can use the same timestamp, though the RTP packets may have different (incrementing) sequence numbers. This may occur, for example, where the data for the frame does not fit into a single RTP packet or for other time or delay reasons. In addition, data frames for each service data flow may be associated with a different timing or cadence at which packets are received. Thus, for example, when using timestamp across different multi-modal flows, the timestamp for the first frame can be arbitrary and/or random and the granularity of the timestamp can be application specific (e.g., audio streams can use 8 kHz clock while video streams can use a 90 kHz clock, etc.). Association indicating component(s) 516 and/or data set associating component(s) 526 of one or more nodes can rectify these possible issues using additional functionality described herein.

For example, in applying the association at Block 608, optionally at Block 622, the association can be applied, based on extracting timestamp synchronization information for the first data and the second data from a protocol message received from an application server or assistance information received from a UE. In an aspect, data set associating component 526, e.g., in conjunction with processor(s) 520, 530, or 312, memory/memories 522, 532, or 316, etc., can apply, based on extracting timestamp synchronization information for the first data and the second data from the protocol message received from the application server (e.g., application server 502) or assistance information received from a UE (e.g., UE 104), the association.

For example, if multiple RTP streams or corresponding service data flows are to be synchronized, RTP control protocol (RTCP) can be used to map the timestamps for each stream to the actual time. For example, a RTCP sender report (SR) message can include a network time protocol (NTP) timestamp, which can be an absolute timestamp, represented using the timestamp format of NTP, which can be 32-bit in seconds and 32-bit in fractional seconds relative to midnight UTC on 1 Jan. 1900. In another example, the SR message can include a RTP timestamp, which corresponds to the same time as the NTP timestamp, but in the same units and with the same random offset as the RTP timestamps in data packets described by this sender report. RTCP SR can indicate the absolute timing of each RTP timestamp across multi-modal flows.

In this regard, in an example, the 5G network can use the timestamp values (e.g., NTP, RTP) of the RTCP SR message for timing synchronization. In an example, RTP timestamps of multiple flows can be associated based on determining which RTP timestamps correspond to the same or similar NTP timestamp in the RTCP SR. For example, an association indicating component 516 of the application server 502 can indicate the timestamp synchronization information (e.g., NTP, RTP timestamps) for each multi-modal flow in the RTCP SR message, and can transmit the RTCP SR message to UPF 195 using N6 interface (e.g., using data flow communicating component 518 and/or as described in Block 610 for application server 502, etc.). In an example, data set associating component 526 of UPF 195 and/or one or more other downstream nodes can use the timestamp synchronization information to associate RTP timestamps of multiple flows (e.g., to associate data of the multiple flows according to RTP timestamp) based on the association between the RTP timestamps and the NTP timestamp (e.g., as described in Block 622 for a UPF 195).

In another example, an association indicating component 516 of the UPF 195 can indicate the timestamp synchronization information (e.g., NTP, RTP timestamps) for each multi-modal flow in the RTCP SR message, and can transmit the RTCP SR message to RAN node 504 using N3 interface (e.g., using data flow communicating component 518 and/or as described in Block 610 for UPF 195, etc.). In an example, data set associating component 526 of RAN node 504 and/or one or more other downstream nodes can use the timestamp synchronization information to associate RTP timestamps of multiple flows (e.g., to associate data of the multiple flows according to RTP timestamp) based on the association between the RTP timestamps and the NTP timestamp (e.g., as described in Block 622 for a RAN node 504). In another example, data set associating component 526 of UPF 195 can extract the timing synchronization information from the RTCP SR message from the application server 502 and can indicate the timing synchronization information to the RAN node 504 in a GTP-U protocol, as described above. In yet another example, data set associating component 526 of UE 104 can extract the timing synchronization information from the RTCP SR message from the application server 502 and can provide the information upstream to the RAN node 504 in assistance information, as described.

In an example, the timing synchronization information can be provided in a RTP header extension, which can provide the timestamp synchronization across multi-modal flows. In another example, a new protocol message can be defined in 5G between the application server 502 and UPF 195 (or other nodes) to negotiate and/or indicate the timestamp synchronization across multi-modal flows. In yet another example, as described, UE 104 can provide the timestamp synchronization across multi-modal flows to the RAN node 504 in assistance information. In another example, the wireless communication technology (e.g., 5G NR) can define an initial value to use for RTP timestamps for multi-modal flows, and the application server 502 can use the initial RTP values for multi-modal flows created for a given application. In this example, timestamp synchronization information may not be needed as the RTP timestamps may be substantially in synchronization.

In another example, in applying the association at Block 608, optionally at Block 624, the association can be applied, based on extracting a first unit of a first timestamp and a second unit of a second timestamp, based on comparing the first timestamp and the second timestamp. In an aspect, data set associating component 526, e.g., in conjunction with processor(s) 520, 530, or 312, memory/memories 522, 532, or 316, etc., can apply, based on extracting the first unit of the first timestamp and the second unit of the second timestamp, the association based on comparing the first timestamp and the second timestamp. For example, data set associating component 526 can compare the first timestamp and the second timestamp based on the corresponding units to determine whether to associate the corresponding first data and second data. As described, for example, the first data and second data can be of different units or granularities or cadences, etc. For example, audio data can be sampled at 8 kHz (e.g., once per 125 microseconds), whereas video data can be sampled at 90 kHz. The clock granularity can be indicated in RTP profile for the corresponding application or data.

In one example, an XR application can obtain a unit of the timestamp from a session description protocol (SDP) indicating a payload type (PT) in the session description, or from PT indicated in RTP header for each RTP packet. In another example, in RTP request for comments (RFC) 3551, timestamp unit can be defined for each payload type. In any case, a data set associating component 526 can obtain this information from the SDP, RTP header, etc., and can use the units of each data to determine whether to apply the association between the data.

For example, the 5G network can know the unit of the timestamp values from the RTP profile (STP) and payload type of the RTP header. For example, an association indicating component 516 of the application server 502 can indicate the payload type of each multi-modal flow in RTP profile (STP), and can transmit the STP to UPF 195 using N6 interface (e.g., using data flow communicating component 518 and/or as described in Block 610 for application server 502, etc.). In an example, data set associating component 526 of UPF 195 and/or one or more other downstream nodes can obtain the payload type of each multi-modal flow, and transmit the unit of timestamp for each multi-modal flow and/or the payload type of the RTP packet to the RAN node 504 (e.g., using N3 interface). For example, data set associating component 526 of the UPF 195 can extract the payload type and/or media name of each multi-modal flow, and can provide the unit of timestamp to the RAN node 504 using GTP-U (or GTP-C) protocol. In another example, UPF 195 can extract the payload type from each RTP packet received from the application server 502, and can provide the payload type to the RAN node 504 using GTP-U protocol.

In another example, data set associating component 526 of RAN node 504 and/or one or more other downstream nodes can extract the PDU set association information, payload type, or other unit identifying information from the STP, PT of RTP header, etc. as indicated by the application server 502. In yet another example, data set associating component 526 of UE 104 can extract the PDU set association information, payload type, or other unit identifying information from the STP, PT of RTP header, etc. as indicated by the application server 502, and can provide the information upstream to the RAN node 504 in assistance information, as described.

In another example, the wireless communication technology (e.g., 5G NR) can define or recommend a fixed PT for dynamic payload types (e.g., video—H.264), and UPF 195 or RAN node 504 can know the unit of timestamp from the PT of the RTP header (e.g., the range of PT can be divided for each multimedia type—e.g., audio, video, haptic), etc. In an example, the timestamp unit can be provided in a RTP header extension. In another example, a new protocol message can be defined in 5G between the application server 502 and UPF 195 (or other nodes) to negotiate and/or indicate the timestamp unit (e.g., from AF to PCF to SMF to AMF to RAN, etc.) and/or the AMF may provide the unit of timestamp to 5GS (e.g., UPF or RAN). In another example, the PCF or SMF can provide the timestamp unit based on 5-tuple (e.g., based on IP address and/or port). In yet another example, as described, UE 104 can provide the timestamp unit to the RAN node 504 in assistance information. In yet another example, the wireless communication technology (e.g., 5G NR) can recommend using a certain timestamp unit.

In other examples, applying the association at Block 606 may be based on information other than (or in addition to) the parameters in the header of the first data and second data. For example, association indicating component 516 of an application server 502, UPF 195, or RAN node 504, and/or data set associating component 526 of a UPF 195, or RAN node 504, can apply the association between the first data and the second data based on determining the last delivered first data or second data. For example, association indicating component 516 and/or data set associating component 526 can determine, for the first data (e.g., PDU set associated with the first service data flow), and association with the last delivered second data (e.g., PDU set associated with the second service data flow), or vice versa. For example, the last delivered PDU set or data can be the last PDU set or data which is successfully delivered to UE. In an example, the jitter of the burst arrival time can change the order of PDU Sets across the multi-modal flows.

In another example, association indicating component 516 of an application server 502, UPF 195, or RAN node 504, and/or data set associating component 526 of a UPF 195, or RAN node 504, can apply the association between the first data and the second data based on determining the last arriving first data or second data. For example, association indicating component 516 and/or data set associating component 526 can determine, for the first data (e.g., PDU set associated with the first service data flow), and association with the last arriving second data (e.g., PDU set associated with the second service data flow), or vice versa. For example, the last arriving PDU set or data can be the last PDU set or data which arrives at UPF 195 or RAN node 504 for delivering to the UE 104. In an example, the jitter of the burst arrival time can change the order of PDU sets across the multi-modal flows.

In another example, association indicating component 516 of an application server 502, UPF 195, or RAN node 504, and/or data set associating component 526 of a UPF 195, or RAN node 504, can apply the association between the first data and the second data based on determining traffic patterns of multi-modal flows. These traffic patterns can be is indicated by Time Sensitive Communication Assistance Information (TSCAI) or can be inferred from the incoming packets. For example, this can remove the jitter effect, but may not accurately reflect when the PDU Set will be consumed at the application layer.

In method 600, optionally at Block 626, the first data and the second data can be transmitted to one or more upstream nodes for delivering to one or more other devices based on the association. In an aspect, data flow communicating component 548, e.g., in conjunction with processor(s) 312, memory/memories 316, etc., can transmit the first data and the second data to one or more upstream nodes (e.g., RAN node 504) for delivering to one or more other devices based on the association. In some examples, UE 104 can include an application that generates the first and second data for providing to other UEs or devices, and as such can determine association between first and second data, and can transmit the first and second data along with, or based on, the association information (as described in various examples herein), to an upstream node for providing to one or more other UEs or devices FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 3. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols.

A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor(s) 880, or memory/memories 882.

The processor(s) 880 may in some cases execute stored instructions to instantiate a UE communicating component 342 (see e.g., FIGS. 1 and 3).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for single carrier-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor(s) 840 or memory/memories 842.

The processor(s) 840 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 a method for wireless communications including receiving, from an application, first data for a first service data flow corresponding to a first device of multiple devices associated with a multi-modal service, receiving, from the application, second data for a second service data flow corresponding to a second device of the multiple devices associated with the multi-modal service, and applying, based on values of one or more parameters in a header of the first data and a header of the second data, an association between the first data and the second data.

In Aspect 2, the method of Aspect 1 includes where the association is based on the first data and the second data having respective timing information that is within a synchronization threshold.

In Aspect 3, the method of any of Aspects 1 or 2 includes transmitting the first data and the second data to one or more downstream nodes for delivering to one or more of the first device or the second device based on the association.

In Aspect 4, the method of Aspect 3 includes where applying the association includes generating, by an application server that executes the application, at least one of metadata for the first data that indicates the association with the second data or metadata for the second data that indicates the association with the first data, and where transmitting the first data and the second data includes transmitting the metadata with one of the first data or the second data.

In Aspect 5, the method of Aspect 4 includes where the metadata is in a RTP header of the first data or the RTP header of the second service data flow.

In Aspect 6, the method of any of Aspects 4 or 5 includes where the metadata for the first data indicates one or more of the second service data flow or an index of the second data in the second service data flow, or the metadata for the second data indicates one or more of the first service data flow or an index of the first data in the first service data flow.

In Aspect 7, the method of any of Aspects 1 to 6 includes where receiving the first data and the second data includes receiving the first data and the second data from an application server, and extracting association information from at least one of a RTP header of the first data or a RTP header of the second data.

In Aspect 8, the method of Aspect 7 includes where applying the association includes applying, based on the extracted association information, the association in one of a GTP-U header of the first data or the GTP-U header of the second data.

In Aspect 9, the method of any of Aspects 7 or 8 includes transmitting, to an upstream node, an indication of the association information.

In Aspect 10, the method of any of Aspects 1 to 9 includes where applying the association is based on extracting, by a network node, a first timestamp of a RTP header of the first data and a second timestamp of the RTP header of the second data, and applying the association based on comparing the first timestamp and the second timestamp.

In Aspect 11, the method of Aspect 10 includes where applying the association is based on one of the first timestamp being a closest in time, of other timestamps of other data in the first service data flow, to the second timestamp, or the second timestamp being a closest in time, of other timestamps of other data in the second service data flow, to the first timestamp.

In Aspect 12, the method of any of Aspects 10 or 11 includes where applying the association is based on one of the first timestamp being a latest in time, of other timestamps of other data in the first service data flow, or the second timestamp being a latest in time, of other timestamps of other data in the second service data flow.

In Aspect 13, the method of any of Aspects 1 to 12 includes where receiving the first data and the second data includes receiving the first data and the second data from an application server, and extracting a first timestamp of a RTCP SR message of the first data and a second timestamp of a RTCP SR of the second data, and where applying the association includes applying, based on the extracted first timestamp and second timestamp, the association in one of a GTP-U header of the first data or the GTP-U header of the second data.

In Aspect 14, the method of any of Aspects 1 to 13 includes extracting a first timestamp of a RTCP SR message of the first data and a second timestamp of a RTCP SR of the second data, and where applying the association is based on comparing the first timestamp and the second timestamp.

In Aspect 15, the method of Aspect 14 includes transmitting, to an upstream node, an indication of one or more of the first timestamp or the second timestamp.

In Aspect 16, the method of any of Aspects 1 to 15 includes extracting a first timestamp of a RTP header extension of the first data and a second timestamp of a RTP header extension SR of the second data, and where applying the association is based at least in part on comparing the first timestamp and the second timestamp.

In Aspect 17, the method of any of Aspects 1 to 16 includes where applying the association is based on extracting, by a network node, timestamp synchronization information for the first data and the second data from a protocol message received from an application server.

In Aspect 18, the method of any of Aspects 1 to 17 includes where applying the association is based on extracting, by a network node, timestamp synchronization information for the first data and the second data from assistance information received from a user equipment (UE).

In Aspect 19, the method of any of Aspects 1 to 18 includes where receiving the first data and the second data includes receiving the first data and the second data from an application server, and determining a first unit of a first timestamp from one of a STP or a PT of a RTP header of the first data and a second unit of a second timestamp from one of a STP or PT of a RTP header of the second data, and where applying the association includes applying, based on a first timestamp and first unit of the first timestamp and a second timestamp and a second unit of the second timestamp, the association in one of a GTP-U header of the first data or the GTP-U header of the second data.

In Aspect 20, the method of any of Aspects 1 to 19 includes determining a first unit of a first timestamp from one of a STP or a PT of a RTP header of the first data and a second unit of a second timestamp from one of a STP or PT of a RTP header of the second data, and where applying the association is based on comparing the first timestamp based on the first unit and the second timestamp based on the second unit.

In Aspect 21, the method of Aspect 20 includes transmitting, to an upstream node, an indication of the association.

In Aspect 22, the method of any of Aspects 1 to 21 includes determining a first unit of a first timestamp from one of a STP or a PT of a RTP header of the first data and a second unit of a second timestamp from one of a STP or PT of a RTP header of the second data, and where applying the association is based at least in part on dividing a first range of timestamp values for the first data based on the first unit and dividing a second range of timestamp values for the second data based on the second unit.

In Aspect 23, the method of any of Aspects 1 to 22 includes where applying the association is based on extracting, by a network node, a first unit of a first timestamp from one of a STP or a PT of a RTP header of the first data and a second unit of a second timestamp from one of a STP or PT of a RTP header of the second data from a protocol message received from an application server.

In Aspect 24, the method of any of Aspects 1 to 23 includes where applying the association is based on determining a first unit of a first timestamp from a 5-tuple of the first data and a second unit of a second timestamp from a 5-tuple of the second data.

In Aspect 25, the method of any of Aspects 1 to 24 includes where applying the association is based on extracting, by a network node, a first unit of a first timestamp from a RTP header extension of the first data and a second unit of a second timestamp from a RTP header extension of the second data.

In Aspect 26, the method of any of Aspects 1 to 25 includes where applying the association is based on extracting, by a network node, a first timestamp unit for the first data and a second timestamp unit for the second data from assistance information received from a UE.

In Aspect 27, the method of any of Aspects 1 to 26 includes transmitting the first data and the second data to one or more upstream nodes for delivering to one or more other devices based on the association.

Aspect 28 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 27.

Aspect 29 is an apparatus for wireless communication including means for performing any of the methods of Aspects 1 to 27.

Aspect 30 is one or more computer-readable media including code executable by one or more processors for wireless communications, the code including code for performing any of the methods of Aspects 1 to 27.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
receive, from an application, first data for a first service data flow corresponding to a first device of multiple devices associated with a multi-modal service;
receive, from the application, second data for a second service data flow corresponding to a second device of the multiple devices associated with the multi-modal service; and
apply, based on extracting association information from at least one of a first real-time transport protocol (RTP) header of the first data or a second RTP header of the second data indicating that the first data is associated with the second data, an association between the first data and the second data.

2. The apparatus of claim 1, wherein the association is based on the first data and the second data having respective timing information that is within a synchronization threshold.

3. The apparatus of claim 1, wherein the one or more processors are, individually or in combination, configured to execute the instructions to cause the apparatus to transmit the first data and the second data to one or more downstream nodes for delivering to one or more of the first device or the second device based on the association.

4. The apparatus of claim 3, wherein the one or more processors are, individually or in combination, configured to execute the instructions to cause the apparatus to apply the association at least in part by generating, by an application server that executes the application, at least one of metadata for the first data that indicates the association with the second data or metadata for the second data that indicates the association with the first data, and wherein the one or more processors are, individually or in combination, configured to execute the instructions to cause the apparatus to transmit the metadata with one of the first data or the second data.

5. The apparatus of claim 4, wherein the metadata is in the first RTP header of the first data or the second RTP header of the second service data flow.

6. The apparatus of claim 4, wherein the metadata for the first data indicates one or more of the second service data flow or an index of the second data in the second service data flow, or the metadata for the second data indicates one or more of the first service data flow or an index of the first data in the first service data flow.

7. The apparatus of claim 1, further comprising transmitting the first data and the second data to one or more upstream nodes for delivering to one or more other devices based on the association.

8. The apparatus of claim 1, wherein the one or more processors are, individually or in combination, configured to execute the instructions to cause the apparatus to apply, based on the extracted association information, the association in one of a first (GPRS) tunneling protocol (GTP)-user plane (U) header of the first data or a second GTP-U header of the second data.

9. The apparatus of claim 1, wherein the one or more processors are, individually or in combination, configured to execute the instructions to cause the apparatus to transmit, to an upstream node, an indication of the association information.

10. The apparatus of claim 1, wherein the one or more processors are, individually or in combination, configured to execute the instructions to cause the apparatus to apply the association based on extracting, by a network node, a first timestamp of the first RTP header of the first data and a second timestamp of the second RTP header of the second data, and applying the association based on comparing the first timestamp and the second timestamp.

11. The apparatus of claim 10, wherein the one or more processors are, individually or in combination, configured to execute the instructions to cause the apparatus to apply the association based on one of the first timestamp being a closest in time, of other timestamps of other data in the first service data flow, to the second timestamp, or the second timestamp being a closest in time, of other timestamps of other data in the second service data flow, to the first timestamp.

12. The apparatus of claim 10, wherein the one or more processors are, individually or in combination, configured to execute the instructions to cause the apparatus to apply the association based on one of the first timestamp being a latest in time, of other timestamps of other data in the first service data flow, or the second timestamp being a latest in time, of other timestamps of other data in the second service data flow.

13. The apparatus of claim 1, wherein the one or more processors are, individually or in combination, configured to execute the instructions to cause the apparatus to receive the first data and the second data from an application server, and extract a first timestamp of a first real-time transport protocol (RTP) control protocol (RTCP) sender report (SR) message of the first data and a second timestamp of a second RTCP SR of the second data, and wherein the one or more processors are, individually or in combination, configured to execute the instructions to cause the apparatus to apply, based on the extracted first timestamp and second timestamp, the association in one of a first (GPRS) tunneling protocol (GTP)-user plane (U) header of the first data or a second GTP-U header of the second data.

14. The apparatus of claim 1, wherein the one or more processors are, individually or in combination, configured to execute the instructions to cause the apparatus to extract a first timestamp of a first real-time transport protocol (RTP) control protocol (RTCP) sender report (SR) message of the first data and a second timestamp of a second RTCP SR of the second data, and wherein the one or more processors are, individually or in combination, configured to execute the instructions to cause the apparatus to apply the association based on comparing the first timestamp and the second timestamp.

15. The apparatus of claim 14, wherein the one or more processors are, individually or in combination, configured to execute the instructions to cause the apparatus to transmit, to an upstream node, an indication of one or more of the first timestamp or the second timestamp.

16. The apparatus of claim 1, wherein the one or more processors are, individually or in combination, configured to execute the instructions to cause the apparatus to extract a first timestamp of a first real-time transport protocol (RTP) header extension of the first data and a second timestamp of a second RTP header extension SR of the second data, and wherein the one or more processors are, individually or in combination, configured to execute the instructions to cause the apparatus to apply the association based at least in part on comparing the first timestamp and the second timestamp.

17. The apparatus of claim 1, wherein the one or more processors are, individually or in combination, configured to execute the instructions to cause the apparatus to apply the association based on extracting, by a network node, timestamp synchronization information for the first data and the second data from a protocol message received from an application server.

18. The apparatus of claim 1, wherein the one or more processors are, individually or in combination, configured to execute the instructions to cause the apparatus to apply the association based on extracting, by a network node, timestamp synchronization information for the first data and the second data from assistance information received from a user equipment (UE).

19. The apparatus of claim 1, wherein the one or more processors are, individually or in combination, configured to execute the instructions to cause the apparatus to receive the first data and the second data from an application server, and determine a first unit of a first timestamp from one of a first real-time transport protocol (RTP) profile (STP) or a payload type (PT) of the first RTP header of the first data and a second unit of a second timestamp from one of a second STP or PT of the second RTP header of the second data, and wherein the one or more processors are, individually or in combination, configured to execute the instructions to cause the apparatus to apply, based on a first timestamp and first unit of the first timestamp and a second timestamp and a second unit of the second timestamp, the association in one of a first (GPRS) tunneling protocol (GTP)-user plane (U) header of the first data or a second GTP-U header of the second data.

20. The apparatus of claim 1, wherein the one or more processors are, individually or in combination, configured to execute the instructions to cause the apparatus to determine a first unit of a first timestamp from one of a first real-time transport protocol (RTP) profile (STP) or a payload type (PT) of the first RTP header of the first data and a second unit of a second timestamp from one of a second STP or PT of the second RTP header of the second data, and wherein the one or more processors are, individually or in combination, configured to execute the instructions to cause the apparatus to apply the association based on comparing the first timestamp based on the first unit and the second timestamp based on the second unit.

21. The apparatus of claim 20, wherein the one or more processors are, individually or in combination, configured to execute the instructions to cause the apparatus to transmit, to an upstream node, an indication of the association.

22. The apparatus of claim 1, wherein the one or more processors are, individually or in combination, configured to execute the instructions to cause the apparatus to determine a first unit of a first timestamp from one of a first real-time transport protocol (RTP) profile (STP) or a payload type (PT) of the first RTP header of the first data and a second unit of a second timestamp from one of a second STP or PT of the second RTP header of the second data, and wherein the one or more processors are, individually or in combination, configured to execute the instructions to cause the apparatus to apply the association based at least in part on dividing a first range of timestamp values for the first data based on the first unit and dividing a second range of timestamp values for the second data based on the second unit.

23. The apparatus of claim 1, wherein the one or more processors are, individually or in combination, configured to execute the instructions to cause the apparatus to apply the association based on extracting, by a network node, a first unit of a first timestamp from one of a first real-time transport protocol (RTP) profile (STP) or a payload type (PT) of the first RTP header of the first data and a second unit of a second timestamp from one of a second STP or PT of the second RTP header of the second data from a protocol message received from an application server.

24. The apparatus of claim 1, wherein the one or more processors are, individually or in combination, configured to execute the instructions to cause the apparatus to apply the association based on determining a first unit of a first timestamp from a 5-tuple of the first data and a second unit of a second timestamp from a 5-tuple of the second data.

25. The apparatus of claim 1, wherein the one or more processors are, individually or in combination, configured to execute the instructions to cause the apparatus to apply the association based on extracting, by a network node, a first unit of a first timestamp from a first real-time transport protocol (RTP) header extension of the first data and a second unit of a second timestamp from a second RTP header extension of the second data.

26. A non-transitory computer-readable storage medium, comprising computer-executable code for wireless communications, the code comprising code for:

receiving, from an application, first data for a first service data flow corresponding to a first device of multiple devices associated with a multi-modal service;

receiving, from the application, second data for a second service data flow corresponding to a second device of the multiple devices associated with the multi-modal service; and applying, based on extracting association information from at least one of a first real-time transport protocol (RTP) header of the first data or a second RTP header of the second data indicating that the first data is associated with the second data, an association between the first data and the second data.

27. A method for wireless communications, comprising:

receiving, from an application, first data for a first service data flow corresponding to a first device of multiple devices associated with a multi-modal service;

receiving, from the application, second data for a second service data flow corresponding to a second device of the multiple devices associated with the multi-modal service; and applying, based on extracting association information from at least one of a first real-time transport protocol (RTP) header of the first data or a second RTP header of the second data indicating that the first data is associated with the second data, an association between the first data and the second data.

28. The method of claim 27, wherein the association is based on the first data and the second data having respective timing information that is within a synchronization threshold.

29. An apparatus for wireless communications, comprising:

means for receiving, from an application, first data for a first service data flow corresponding to a first device of multiple devices associated with a multi-modal service;

means for receiving, from the application, second data for a second service data flow corresponding to a second device of the multiple devices associated with the multi-modal service; and means for applying, based on extracting association information from at least one of a first real-time transport protocol (RTP) header of the first data or a second RTP header of the second data indicating that the first data is associated with the second data, an association between the first data and the second data.

* * * * *